US009167188B2

(12) United States Patent
Kim et al.

(10) Patent No.: US 9,167,188 B2
(45) Date of Patent: Oct. 20, 2015

(54) DISPLAY DEVICE AND CONTROL METHOD THEREOF

(75) Inventors: Jungeun Kim, Seoul (KR); Bomi Kim, Seoul (KR); Kunsik Lee, Seoul (KR); Junsic Park, Seoul (KR); Junghoon Son, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 13/190,231

(22) Filed: Jul. 25, 2011

(65) Prior Publication Data

US 2012/0044136 A1    Feb. 23, 2012

(30) Foreign Application Priority Data

Aug. 17, 2010  (KR) .................. 10-2010-0079120
Aug. 17, 2010  (KR) .................. 10-2010-0079123
Sep. 14, 2010  (KR) .................. 10-2010-0089960

(51) Int. Cl.
*G06F 3/01*    (2006.01)
*G06F 3/042*   (2006.01)
*G06F 3/00*    (2006.01)
*H04N 5/44*    (2011.01)
*H04N 21/4223* (2011.01)
*H04N 21/426*  (2011.01)
*H04N 21/431*  (2011.01)
*H04N 21/442*  (2011.01)
(Continued)

(52) U.S. Cl.
CPC .............. *H04N 5/4403* (2013.01); *G06F 3/005* (2013.01); *G06F 3/017* (2013.01); *G06F 3/0425* (2013.01); *H04N 21/4223* (2013.01); *H04N 21/4263* (2013.01); *H04N 21/4312* (2013.01); *H04N 21/44218* (2013.01); *H04N 21/482* (2013.01); *H04N 21/485* (2013.01); *H04N 21/4828* (2013.01); *H04N 21/4882* (2013.01); *H04N 2005/4425* (2013.01); *H04N 2005/4428* (2013.01); *H04N 2005/4432* (2013.01)

(58) Field of Classification Search
CPC . G06F 3/017; G06F 1/1694; G06F 17/30811; G06F 17/30035; G06F 3/0425; G06F 3/005
USPC ........................................................ 715/863
See application file for complete search history.

(56) References Cited

U.S. PATENT DOCUMENTS

2008/0052643 A1*  2/2008 Ike et al. ................. 715/863
2008/0129686 A1   6/2008 Han ......................... 345/156
(Continued)

FOREIGN PATENT DOCUMENTS

CN    101196793 A    6/2008
EP    1 139 286 A1   10/2001
(Continued)

OTHER PUBLICATIONS

European Search Report dated Jan. 2, 2013 for Application 11 174 560.0.

(Continued)

*Primary Examiner* — Gerald Johnson
*Assistant Examiner* — Christopher Kohlman
(74) *Attorney, Agent, or Firm* — KED & Associates, LLP

(57) ABSTRACT

Disclosed with are a display device and a control method thereof. The method includes recognizing a first motion of a user; and assigning a control right to perform functions of the display devices through motions to the user in response to the recognized first motion.

11 Claims, 17 Drawing Sheets

(51) Int. Cl.
*H04N 21/482* (2011.01)
*H04N 21/485* (2011.01)
*H04N 21/488* (2011.01)

(56) References Cited

U.S. PATENT DOCUMENTS

| | | | |
|---|---|---|---|
| 2008/0181574 A1 | 7/2008 | Ellis et al. | |
| 2009/0079813 A1* | 3/2009 | Hildreth | 348/14.03 |
| 2009/0133051 A1 | 5/2009 | Hildreth | |
| 2009/0315740 A1* | 12/2009 | Hildreth et al. | 341/20 |
| 2010/0275159 A1* | 10/2010 | Matsubara et al. | 715/810 |
| 2010/0281437 A1* | 11/2010 | Stone-Perez et al. | 715/863 |
| 2010/0306685 A1* | 12/2010 | Giaimo et al. | 715/765 |
| 2011/0304632 A1* | 12/2011 | Evertt et al. | 345/474 |
| 2012/0005632 A1* | 1/2012 | Broyles et al. | 715/863 |

FOREIGN PATENT DOCUMENTS

| | | |
|---|---|---|
| EP | 1 736 908 A2 | 12/2006 |
| EP | 1 865 719 A2 | 12/2007 |

OTHER PUBLICATIONS

Chinese Office Action dated Mar. 11, 2014, issued in Application No. 201110234323.3.

* cited by examiner

DISPLAY DEVICE AND CONTROL METHOD THEREOF

CROSS-REFERENCE TO RELATED APPLICATION(S)

This application claims the benefit of Korean Patent Application Nos. 10-2010-0079120 (filed on Aug. 17, 2010), 10-2010-0079123 (filed on Aug. 17, 2010) and 10-2010-0089960 (filed on Sep. 14, 2010), which are hereby incorporated by reference in their entireties into this application.

BACKGROUND OF THE INVENTION

1. Technical Field

The present invention relates to a method for controlling the operations of a display device.

2. Description of the Related Art

Recently, a digital broadcasting reception device (digital television) provides various functions, such as a function of receiving Electronic Program Guides (EPG), a bidirectional communication function, an Internet access function or the like, besides a function of receiving analog or digital broadcastings. Furthermore, the digital broadcasting reception device can even take the role of a server in home network environment or ubiquitous environment.

As a display device, such as the digital broadcasting reception device or the like, performs such many functions, items which have to be controlled by a user are increased and complicated. Accordingly, there are problems in that it is impossible to efficiently control such complicated functions using an existing remote controller with use of an infrared communication method, and a user always has to carry the remote controller for control of the functions.

SUMMARY OF THE INVENTION

An object of embodiments according to the present invention is to provide a method for efficiently controlling a display device.

According to an aspect of the present invention, there is provided a method for controlling a display device by recognizing a motion of a user, including: recognizing a first motion of the user; and assigning a control right to perform functions of the display devices through motions to the user in response to the recognized first motion.

According to another aspect of the present invention, there is provided a motion recognition unit for recognizing a motion taken by the user; and a control unit for assigning a control right to perform functions of the display device through motions to the user in response to the first motion of the user recognized by the motion recognition unit, wherein the display device is not controlled by motions of other users except for the user given with the right.

Meanwhile, the method for controlling the display device may be implemented as a computer-readable recording media recorded with programs for causing a computer to perform the method.

DESCRIPTION OF THE PREFERRED EMBODIMENTS

A display device and a control method thereof according to embodiments of the present are described below with accompanying drawings.

Figure 1:
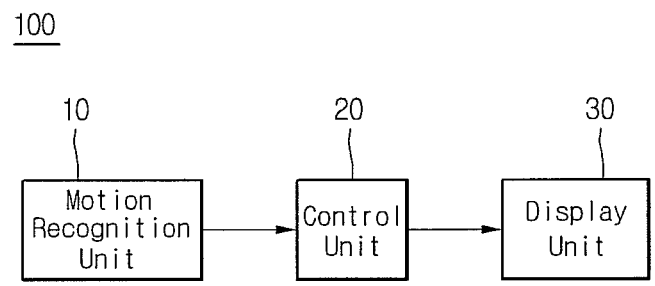
FIG. 1 is a block diagram schematically illustrating a configuration of a display device according to an embodiment of the present invention.

FIG. 1 shows a block diagram schematically illustrating the configuration of a display device according an embodiment of the present invention. The display device shown in this drawing may include a motion recognition unit 10, a control unit 20 and a display unit 30.

For example, the display device 100 according to the embodiment of the present invention may be a digital broadcasting reception device (digital television) capable of various types of content services, such as a real-time broadcasting service, a COD (Contents on Demand) service, a game service, a news service, a video communication service or the like to a user using an internet network coupled to respective homes in addition to existing electronic wave mediums.

IPTV (Internet Protocol TV) can be exemplified as a service providing contents, using the Internet network. The IPTV technology implies transmitting and providing various information services, video contents, and broadcast to user's televisions, by using high speed internet network.

Furthermore, the display device 100 may be broadband TV, web TV or the like, having the form of a network TV further developed from the IPTV. In the broadband TV or the web TV, there is a plurality of content providers unlike IPTV, and a user may be connected separately to the plurality of content providers and be provided with contents, such as various VOD, games or the like, provided by the content providers.

Referring to FIG. 1, the motion recognition unit 10 recognizes the motion of a user, for example, physical information, such as the face, hands or legs of the user, and, for this, may include a camera module for capturing the images of the user.

Figure 2:
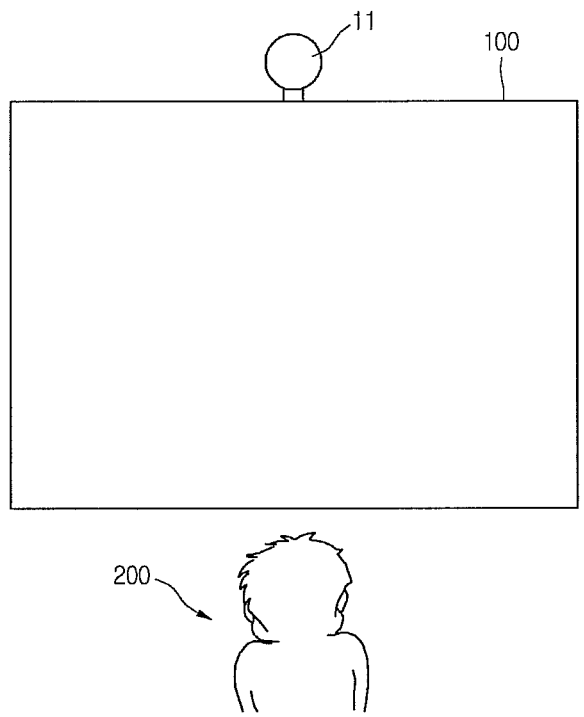
FIG. 2 is a diagram explaining a method for controlling the display device by recognizing the motions of a user.

For example, the motion recognition unit 10 includes the camera module 11 attached on the upper end, or the like of the display device 100 as shown in FIG. 2, and may recognize the motion of the user 200 using the camera module 11.

For example, the motion recognition unit 10 may include various devices capable of capturing images, such as a digital camera, a COMS camera, a CCD (Charged Coupled Device) camera, or the like, various sensor devices capable of detecting a subject, and the like.

According to an embodiment of the present invention, the camera module included in the motion recognition unit 10 may capture images related to the gestures of a user's hands, such as the shapes, motion, or the like of the user's hands and recognizes the motion of the user's hands.

For example, the motion recognition unit 10 detects the area of the user's hands from the captured user image. For this, the motion recognition unit 10 discriminates the color of the hands from the color of a background exclusive of the hands to extract the region of the user's hands.

Furthermore, the motion recognition unit 10 may recognize, the motion of the user's hands, for example, the shape or movement, or the like of the hands, the using the region of the user's hands as extracted above.

More specifically, the motion recognition unit 10 may represent the movement of the user's hands as coordinates on predetermined x, y and z axes or vectors.

The control unit 20 may perform a function of the display device 100 corresponding to the motion of the user, for example, the motion of the user's hands recognized by the motion recognition unit 10.

For this, a plurality of user motions may respectively correspond to the plurality of functions of the display device 100 which can be performed in response to the motion of the user, and information related thereto, such as information about corresponding functions and the motions of the user's hands corresponding thereto may be stored in a storage unit (not shown).

The control unit 20 may compare the information about the motion of the user's hands input from the motion recognition unit 10 with information stored in the storage unit (not shown) and, when there is the information about the motion of the hands matched therewith, perform the function of the display device 100 corresponding thereto.

Figure 3:
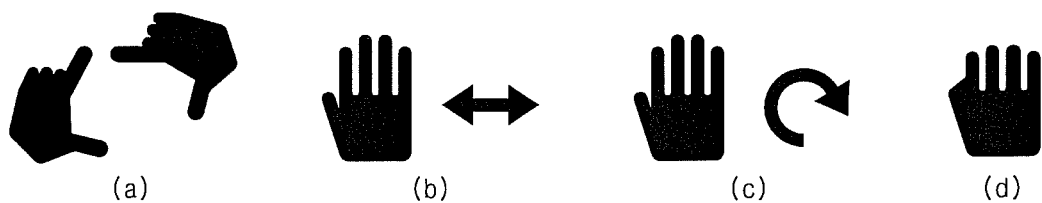
FIG. 3 shows embodiments of user motions respectively corresponding to the functions of the display device.

FIG. 3 shows embodiments of user motions respectively corresponding to the functions of the display device.

Referring to FIG. 3(*a*), when a user 200 takes a hand motion having a shape made by extending the index fingers and thumbs of both hands and placing the tips of your index fingers and thumbs of both hands together, the motion of the user's hands can correspond to a specific function of the display device 100, for example, a channel information display function.

That is, when the user 200 takes the hand motion as shown in FIG. 3(*a*), the motion recognition unit 10 recognizes the shape of the motion of the user's hands, and outputs information related thereto to the control unit 20, and the control unit 20 performs a function corresponding to the input information, that is, the broadcasting channel information display function.

Figure 4:
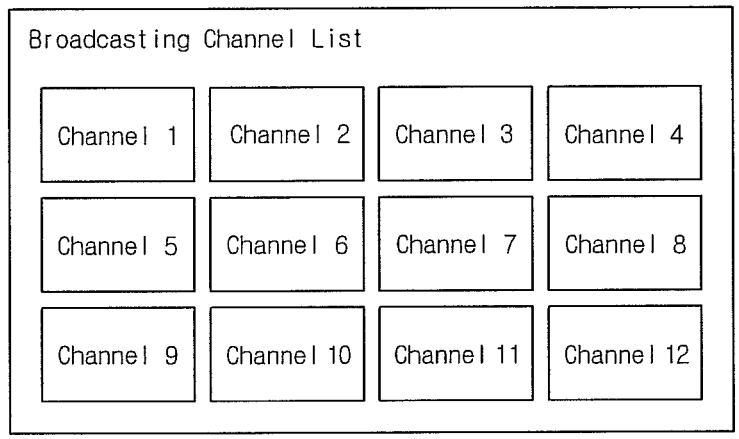
FIG. 4 is a diagram showing an embodiment of a method for displaying broadcasting channel information.

FIG. 4 shows an embodiment of a method for displaying broadcasting channel information. Pieces of Information respectively corresponding to a plurality of receivable broadcasting channels, that is, first to twelfth channels may be displayed on the screen of the display device 100.

The displayed broadcasting channel information may include the broadcasting station's name and channel number of a corresponding channel, the title and substance of a content, which is broadcast on the channel currently or during a specific time zone, or the like in forms of texts or images.

According to an embodiment of the present invention, information about the plurality of broadcasting channels displayed on the screen of the display device 100 may be provided to a channel browser including images corresponding to the videos of respective broadcasting channels, more specifically, thumbnail images, movie clips, or the like.

The user selects any one of the pieces of information about the broadcasting channels displayed on the screen as described above, thereby causing the contents of a desired channel to be replayed.

Referring to FIG. 3(*b*), when the user 200 takes a hand motion made by unfolding his/her palm and then moving it left or right, the motion of the user's hands can correspond to a specific function of the display device 100, for example, channel switching.

That is, when the user 200 takes the hand motion as shown in FIG. 3(*b*), the motion recognition unit 10 recognizes the shape and movement of the user's hands, and outputs information related thereto to the control unit 20, and the control unit 20 performs a function corresponding to the input information, that is, the channel switching.

For example, when the user 200 unfolds his/her palm toward the display device 100 and then moves it right, the channel number may be increased, and when the user 200 moves it left, the channel number may be decreased.

Referring to FIG. 3(*c*), when the user 200 takes a hand motion made by unfolding his/her palm and then rotating it, the motion of the user's hands can correspond to a specific function of the display device 100, for example, audio output volume adjustment.

That is, when the user 200 takes the hand motion as shown in FIG. 3(*c*), the motion recognition unit 10 recognizes the shape and movement of the user's hands, and outputs information related thereto to the control unit 20, and the control unit 20 performs a function corresponding to the input information, that is, the audio output volume adjustment.

For example, when the user 200 unfolds his/her palm toward the display device 100 and then rotates it in a clockwise direction, the audio output volume may be increased, and when the user 200 rotates it in a counter-clockwise direction, the audio output volume may be decreased.

Referring to FIG. 3(*d*), when the user 200 takes a hand motion having a shape made by clenching his/her fist, the motion of the user's hands can correspond to a specific function of the display device 100, for example, a menu selection function.

That is, when the user 200 takes the hand motion as shown in FIG. 3(*d*), the motion recognition unit 10 recognizes the shape of the motion of the user's hands, and outputs information related thereto to the control unit 20, and the control unit 20 performs a function corresponding to the input information, that is, the menu selection function.

In addition to the above-described motions, the control unit 20 controls the entire operations of the display device 100, for example, performs control such that the display unit 30 displays images corresponding to broadcasting channels selected by the user or various contents.

The details of the configurations and operations of the control unit 20 and the display unit 30 will be described below with reference to FIG. 5.

Figure 5:
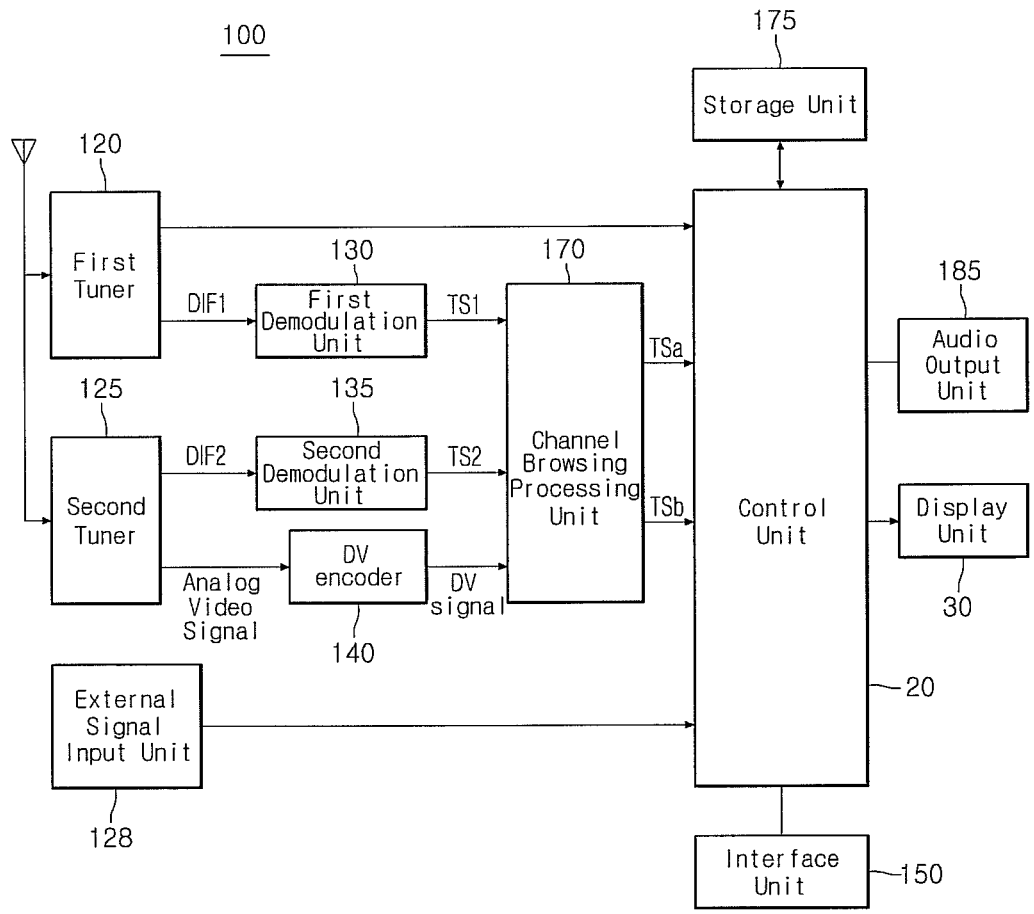
FIG. 5 is a block diagram showing a configuration of a display device according to another embodiment of the present invention.

FIG. 5 shows the block diagram of the configuration of a display device according to another embodiment of the present invention.

Referring to FIG. 5, the display device 100 may include a first tuner 120, a second tuner 125, an external signal input unit 128, a first demodulation unit 130, a second demodulation unit 135, an analog/digital conversion unit 140, an interface unit 150, a control unit 20, a channel browsing processing unit 170, a storage unit 175, a display unit 30 and an audio output unit 185.

The first tuner 120 selects RF (Radio Frequency) broadcasting signals corresponding to a channel selected by a user among RF broadcasting signals received via an antenna and converts the selected RF broadcasting signals into intermediate frequency signals or baseband video/audio signals.

For example, when the selected RF broadcasting signals are digital broadcasting signals, conversion into digital IF signals (DIF1) is performed, and when the selected RF broadcasting signals are analog broadcasting signals, conversion into analog baseband video/audio signals (CVBS1/SIF) is performed. That is, the first tuner 120 may be a hybrid tuner capable of processing digital broadcasting signals and analog broadcasting signals. The analog baseband video/audio signals (CVBS 1/SIF) output from the first tuner 120 may be directly input to the control unit 20.

Furthermore, the first tuner 120 may receive RF broadcasting signals carried on a single carrier according to a ATSC (Advanced Television System Committee) scheme or RF broadcasting signals carried on a plurality of carriers according to a DVB (Digital Video Broadcasting) scheme.

The second tuner 125 selects RF (Radio Frequency) broadcasting signals corresponding to a channel selected by a user among RF broadcasting signals received via an antenna and converts the selected RF broadcasting signals into intermediate frequency signals or baseband video/audio signals, like the first tuner 120.

Meanwhile, the second tuner 125 can subsequently/periodically select RF broadcasting signals corresponding to all pre-stored broadcasting channels through a channel memory function among RF broadcasting signals received via the antenna and convert them into intermediate frequency signals or baseband video/audio signals. In the embodiment of the present invention, the video of another pre-stored channel is displayed on a part of the screen in the form of a thumbnail, so that it is possible to subsequently/periodically receive the RF broadcasting signals of the all pre-stored channels.

For example, the first tuner 120 may convert main RF broadcasting signals selected by the user into intermediate frequency signals or baseband video/audio signals, and the second tuner 125 may subsequently/periodically select all RF broadcasting signals (sub RF broadcasting signals except the main RF broadcasting signals or all RF broadcasting signals and convert them into intermediate frequency signals or baseband video/audio signals.

The first demodulation unit 130 receives digital IF signals (DIF 1) converted by the first tuner 120 and performs a demodulation operation.

For example, when the digital IF signals (DIF 1) output by the first tuner 120 are based on the ATSC scheme, the first demodulation unit 130 performs a 8-VSB (8-Vestigal Side Band) demodulation. Furthermore, the first demodulation unit 130 may perform channel decoding.

For this, the first demodulation unit 130 may include a Trellis decoder, a de-interleaver, a Reed Solomon decoder and the like and perform Trellis decoding, de-interleaving and Reed Solomon decoding.

For example, when the digital IF signals (DIF 1) output by the first tuner 120 are based on the DVB scheme, the first demodulation unit 130 performs a COFDMA (Coded Orthogonal Frequency Division Modulation) demodulation. Furthermore, the first demodulation unit 130 may perform channel decoding.

For this, the first demodulation unit 130 may include a convolution decoder, a de-interleaver, a Reed Solomon decoder and the like and perform convolution decoding, de-interleaving and Reed Solomon decoding.

The external signal input unit 128 performs signal input or the like with respect to an external device. For this, the external signal input unit 128 may include an A/V input/output unit and a wireless communication unit.

The external signal input unit 128 may be connected to an external device, such as a digital versatile disk (DVD), a blu-ray, a game device, a camcorder, a computer (notebook) or the like and deliver, external input video signals, external audio signals and external input data signals to the control unit 20 within the display device 100. Furthermore, video signals, audio signals and data signals which are processed by the control unit 20 may be output to another external device.

The A/V input/output unit may include an Ethernet terminal, a USB terminal, a Composite Video Banking Sync (CVBS) terminal, a component terminal, a S-video terminal (analog), a Digital Visual Interface (DVI) terminal, a High Definition Multimedia Interface (HDMI) terminal, a RGB terminal, a D-SUB terminal, an IEEE 1394 terminal, a SPDIF terminal, a Liquid HD terminal or the like in order to input/output the video/audio signals to the external device.

Meanwhile, although not shown in the drawing, various input signals input through the external signal input unit 128 may be input to the channel browsing processing unit 170 as described below, on which a process of extracting thumbnail images may be performed.

For example, the analog signals input through the CVBS terminal and the S-video terminal may be converted into the digital signals and be input to the channel browsing processing unit 170 as described above. In addition, the digital signals input through another input terminal may be directly input to the channel browsing processing unit 170 without analog/digital conversion.

Herein, the digital signals output by the external signal input unit 128 may be stream signals, for example, MPEG-2 transport streams (TS) into which MPEG-2 compressed video signals, Dolby AC-3 coded audio signals, and the like are multiplexed.

The wireless communication unit may perform wireless internet connection. For example, in order for wireless internet connection, WLAN (Wireless LAN) (Wi-Fi), Wibro (Wireless broadband), Wimax (World Interoperability for Microwave Access), HSDPA (High Speed Downlink Packet Access) or the like may be used.

Meanwhile, the wireless communication unit can perform short distance wireless communication with other electronic devices. For example, Bluetooth, Radio Frequency Identification (RFID), infrared Data Association (IrDA), Ultra Wideband (UWB), ZigBee, etc. can be used.

Meanwhile, the external signal input unit 128 may be connected to various set-top boxes via at least one of the above-described respective terminals and then perform input/output operations with respect to the set-top boxes.

For example, when the set-top box is a set-top box for IP (Internet Protocol) TV, in order to make bidirectional communication possible, the video, audio and data signals signal-processed by the set-top box for IPTV may be delivered to the control unit 20, and the signals by the control unit 20 may be delivered to the set-top box for IPTV.

Meanwhile, the video, audio and data signals signal-processed by the set-top box for IPTV may be passed through the channel browsing processing unit 170 and be processed by the control unit 20

The above-described IPTV may include an ADSL-TV, a VDSL-TV, a FTTH-TV and the like according to the kinds of transmission networks and may include a TV over DSL, a Video over DSL, a TV over IP (TVIP), a Broadband TV (BTV) and the like. Furthermore, the IPTV may include an Internet TV capable of accessing Internet, or a full-browsing TV.

The first demodulation unit 130 may perform demodulation and channel decoding, and output stream signals (TS 1). In this case, the stream signals (TS 1) may be signals into which video signals, audio signals, and data signals are multiplexed. For example, the stream signals (TS 1) may be MPEG-2 Transport Streams (TS) into which MPEG-2 formatted video signals, Dolby AC-3 formatted audio signals and the like are multiplexed. Specifically, the MPEG-2 TS may include a header of 4 bytes and a payload of 184 bytes.

The stream signals (TS1) are input to the control unit 20, on which de-multiplexing, signal processing and the like are then performed. In this embodiment of the present invention, the stream signals are input to the channel browsing processing unit 170, on which processing for channel browsing is then performed, before the being input to the control unit 20. The channel browsing will be described below.

Meanwhile, the above-described first demodulation unit 130 may be provided separately according to the ATSC scheme and the DVB scheme. That is, an ATSC demodulation unit and a DVB demodulation unit may be provided.

The second demodulation unit 135 receives digital IF signals (DIF 2) converted by the second tuner 125, performs a demodulation operation and outputs stream signals (TS 2). The operation of the second demodulation unit 135 is omitted by referring to the operation of the first demodulation unit 130 as described above.

Meanwhile, when the signals output by the second tuner 125 are analog baseband video signals (CVBS 2), an operation for conversion into digital signals by the analog/digital conversion unit 140 is necessary.

The analog/digital conversion unit 140 converts input analog signals into digital signals. When input signals are video signals, the input signals can be converted into digital video signals (DV).by performing sampling and quantization thereon. The converted digital signals are un-decoded signals. The converted digital video signals (DV) are input to the channel browsing processing unit 170, and then processed.

The interface unit 150 may deliver signals input by a user to the control unit 20 or deliver signals from the control unit 20 to the user. For example, the interface unit 150 may receive user input signals related to power on/off, channel selection, screen settings or the like, from a remote control device or transmits signals from the control unit 20 to the remote control device according to various communication methods, such as a RF (Radio Frequency) communication method or an Infrared (IR) communication method or the like.

According to an embodiment of the present invention, the interface unit 150 may be configured to include the motion recognition unit 10 as described with reference to FIGS. 1 to 4, and therefore recognize the motion of a user and output information related thereto to control unit 20.

The control unit 20 may generate and output signals for video and audio output by demultiplexing input streams and signal-processing the demultiplexed signals. In addition, the control unit 20 may control the entire operations of the display device 100.

Although not shown, the control unit 20 may include a demultiplexing unit, a video processing unit, an audio processing unit, a user input signal processing unit, and the like.

The control unit 20 may demultiplex input stream signals, for example, MPEG-2 TS and separate them into video signals, audio signals, and data signals.

Furthermore, the control unit 20 may perform video processing on the demultiplexed video signals. For example, when the demultiplexed video signals are encoded video signals, they may be decoded. In particular, when the demultiplexed video signals are MPEG-2 encoded video signals, they may be decoded by a MPEG-2 decoder. Furthermore, the demultiplexed video signals are H.264 encoded video signals according to a DMB (Digital Multimedia Broadcasting) scheme or a DVB-H scheme, they may be decoded by a H.264 decoder.

Furthermore, the control unit 20 may process the adjustment of the brightness, tint and color of video signals, or the like.

The video signals video-processed by the control unit 20 are input to the display unit 30 and displayed. Furthermore, they may be input to an external output terminal connected to an external output device.

Furthermore, the control unit 20 may perform audio processing on the demultiplexed audio signals. For example, when the demultiplexed audio signals are encoded audio signals, they may be decoded. In particular, when the demultiplexed audio signals are MPEG-2 encoded audio signals, they may be decoded by a MPEG-2 decoder.

Furthermore, when the demultiplexed audio signals are MPEG 4 BSAC (Bit Sliced Arithmetic Coding) encoded audio signals according to a terrestrial DMB (Digital Multimedia Broadcasting), they may be decoded by a MPEG 4 decoder. In addition, when the demultiplexed audio signals are MPEG 2 AAC encoded audio signals according to a DMB scheme or a DVB-H scheme, they may be decoded by an AAC (Advanced Audio Codec) decoder.

Furthermore, the control unit 20 may perform adjustment for base, treble, volume, or the like.

The audio signals processed by the control unit 20 are input to the audio output unit 185, for example, a speaker, and are then output as audio. Furthermore, they may be input to an external output terminal connected to an external output device.

Furthermore, the control unit 20 may perform data processing on the demultiplexed data signals. For example, when the demultiplexed data signals are encoded data signals, they may be decoded. The encoded data signals may be EPG (Electronic Program Guide) information including broadcasting information, such as the start time and end time of broadcasting programs broadcast on respective channels, and the like.

For example, the EPG information may be TSC-PSIP (ATSC-Program and System Information Protocol) information in the ATSC scheme, and may include DVB-SI (DVB-Service Information) information in the DVB scheme. The ATSC-PSIP information or the DVB-SI information may be information included in the header (4 bytes) of the above-described stream, that is, MPEG-2 TS.

Furthermore, the control unit 20 may perform OSD (On Screen Display) processing. Specifically, the control unit 20 may generate signals for displaying various information on the screen of the display unit 30 in graphics or texts based on at least one of the video-processed video signal and the data-processed data signal and a user input signal from the remote control device. The generated signals may be input to the display unit 30 along with the video-processed video signals and data-processed data signals.

The signals generated to display graphics or texts may include various data, such as the user interface screen, various menu screens, widgets, icons, or the like of the display device 100.

The channel browsing processing unit 170 may perform browsing processing on at least one of broadcasting signals corresponding to received channels and various input video signals input through the external signal input unit 128.

Specifically, the demodulation unit 130 or 135 receives stream signals (TS 1 or TS 2) demodulated and channel-decoded, stream signals from the external signal input unit 128 or digital signals (DV) converted by the analog/digital conversion unit 140, demultiplexes the stream signals (TS 1 or TS 2), extracts some of the demultiplexed video signals and perform multiplexing based on video signals including the extracted video signals, thereby outputting new stream signals (TSa). For example, the stream signals (TSa or TSb) may be the MPEG 2 TS.

Furthermore, the channel browsing processing unit 170 may output the main stream signals (TSb) corresponding to the main video signals displayed on a main area among the video signals displayed on the display unit 30 as they are, without any processing, and may perform channel browsing on sub scream signals (TSa) corresponding to sub video signals displayed on a sub area among the video signals displayed on the display unit 30 and output the sub scream signals (TSa) as described above.

According to the embodiment of the present invention, partial videos of the broadcasting signals of a plurality of channels are extracted and re-encoded in a stream form by the channel browsing processing unit 170, so that, when a channel list is displayed on the display unit 30, at least parts of the videos of the broadcasting signals of the plurality of channels may be displayed on the screen in a thumbnail form. Accordingly, the user can intuitively know contents broadcast on other channels.

The channel browsing processing unit 170 extracts partial videos of various external input videos input via the external signal input unit 128 and re-encodes them in the stream form, so that when an external input list is displayed on the display unit 30, at least parts of the external input videos from a plurality of external input devices may be displayed on the screen in the thumbnail form. Accordingly, the user can intuitively know contents input from the external input devices.

The channel browsing processing unit 170 extracts partial videos of the videos of the broadcasting signals of the above-described channels and the above-described external input videos and re-encodes them in the stream form, so that when the channel list and the external input list are displayed on the display unit 30, at least parts of the videos of the broadcasting signals of the plurality of channels and the external input videos from the plurality of external input devices may be displayed on the screen in the thumbnail form.

Accordingly, the user can intuitively know contents related to the plurality of channels and input from the external input devices.

The storage unit 175 may store respective programs for signal processing and control in the control unit 20 and the signal-processed video signals, audio signals and data signals.

Furthermore, the storage unit 175 may perform a function for temporally storing the video, audio or data signals input from the external signal input unit 128.

Meanwhile, the storage unit 175 may store corresponding broadcasting channels through a channel memory function and, for this, may include a storage medium having any one type of a flash memory type, a hard disk type, a multimedia card micro type, card-typed memory (for example, SD or XD memory, etc.), RAM and ROM (EEPROM etc.).

Although the storage unit 175 is shown to be prepared separately from the control unit 20, the present invention is not limited thereto, and the storage unit 175 may be prepared to be included in the control unit 20.

Meanwhile, the video display device 100 replays a file (a moving image file, a still image file, a music file, a text file or the like) stored in the storage unit 175 to provide it to a user.

The display unit 30 can convert the video signals, data signals and OSD signals processed by the control unit 20 or the video signals, data signals and the like received by the external signal input unit 128 into respective R, G, B signals to generate operation signals.

The display unit 30 may be implemented in various forms, such as a PDP, a LCD, a OLED, a flexible display, a 3D display, and the like. Furthermore, the display unit 30 is configured using a touch screen, so that it can be used as an input device in addition to an output device.

The audio output unit 185 receives signals audio-processed by the control unit 20, for example, stereo signals, 3.1 channel signals, or 5.1 channel signals and outputs them as audio. The audio output unit 185 may be implemented using various forms of speakers.

Meanwhile, although the display device 100 is shown to include two tuners 120 and 125 in FIG. 5, the present invention is not limited thereto, and it may include one tuner or three or more tuners.

The above-described display device 100 may be a fixed type digital broadcasting receiver capable of receiving at least one of a ATSC based (8-VSB based) digital broadcast, a DVB-T based (COFDM based) digital broadcast, an ISDB-T based (BST-OFDM based) digital broadcast, a fixed type, and may be a mobile type digital broadcasting receiver capable of receiving at least one of a terrestrial DMB based digital broadcast, a satellite DMB based digital broadcast, a ATSC-M/H based digital broadcast, a DVB-H based (COFDM based) digital broadcast, a MediaFLO (Forward Link Only) based digital broadcast, and the like. Furthermore, it may be a digital broadcasting receiver for cables, satellite communication or IPTVs.

According to a first embodiment of the present invention, information about the recognized motions of a user or the functions of the display device performed in response thereto is displayed using indicators placed on a screen, so that intuitive feedback for functions currently performed in the display device may be efficiently delivered to the user, thereby efficiently guiding the control motions of the user and, at the same time, reducing occurrence of control errors.

Figure 6:
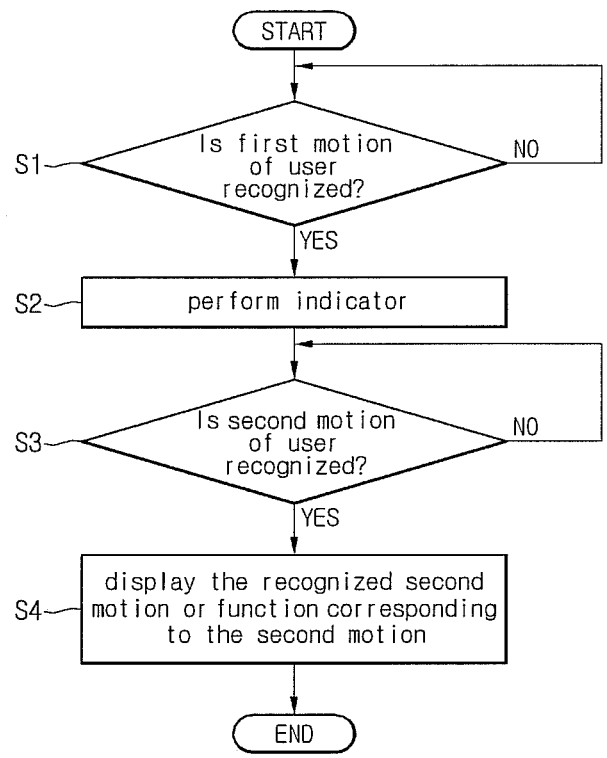
FIG. 6 is a flowchart showing a first embodiment of a method of controlling the display device according to the present invention.

FIG. 6 is a flow chart showing a first embodiment of a method for controlling a display device according to the present invention, which will be described in connection with the configuration of the display device 100 shown in FIGS. 1 and 5.

Referring to FIG. 6, the motion recognition unit 10 recognizes a first motion of a user (step S1), and performs an indicator in response to the recognized first motion of the user (step S2).

For example, the first motion may be a predetermined motion in order to start to control the display device 100 through the motion of the user.

Figure 7:
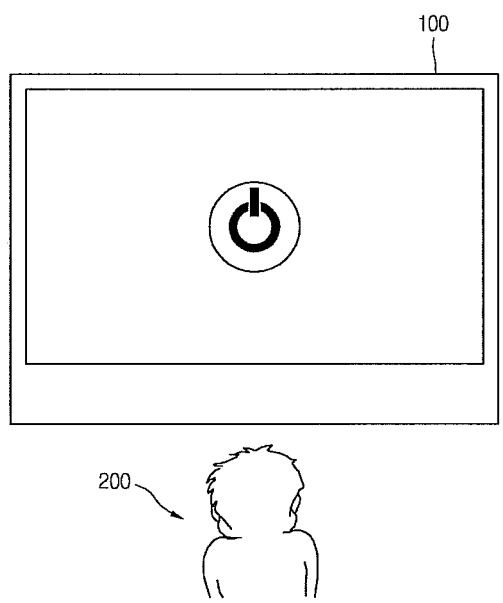
FIGS. 7 to 16 are diagrams showing embodiments of a method for displaying the motions of a user and functions of the display device corresponding thereto.

Referring to FIG. 7, when the user 200 is located in front of the display device 100, for example, at a specific location ahead of the display device 100 which can be recognized by the motion recognition unit 10, the display device 100 may enter a power standby state, so that an image representing the state may be displayed on the screen.

Figure 8:
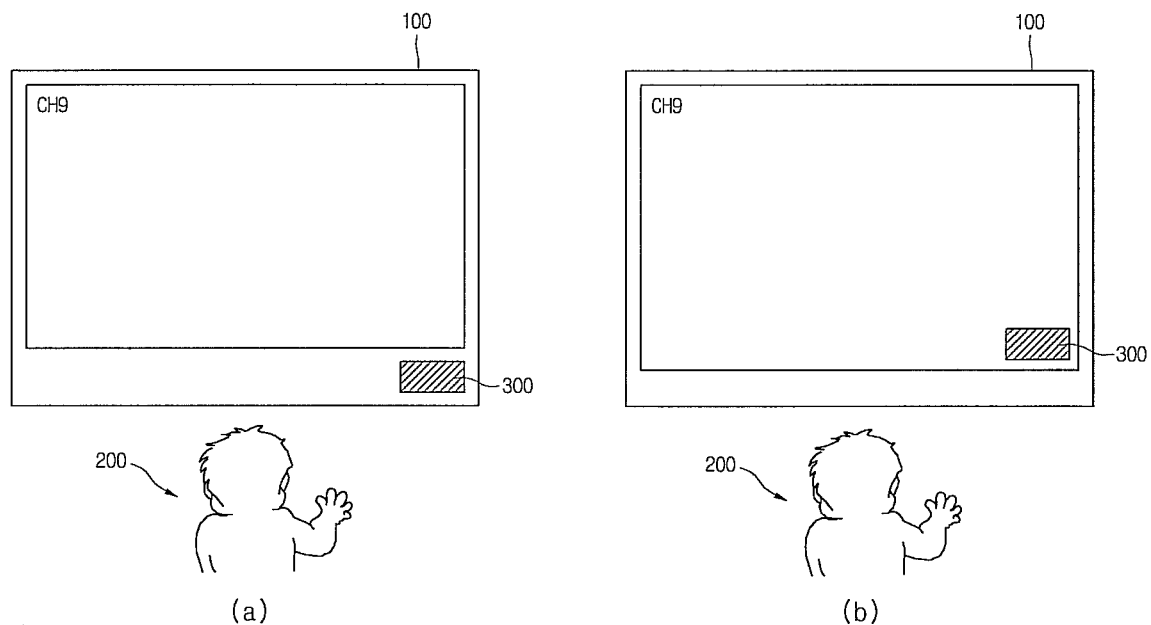

In addition, when the user 200 takes a first motion to start to control the display device 100, for example, a motion of raising one hand, as shown in FIG. 8(*a*), the motion recognition unit 10 may recognizes the first motion of raising the user 200's hand.

Accordingly, the control unit 20 sets the display device 100 to be in a state which is controllable by the motion of the user 200 in response to the recognized first motion and performs control such that the display unit 30 displays an indicator 300 representing the current control state of the display device 100 on it's screen.

For example, the display unit 30 may display the indicator 300 representing information about the user's motion recognized through the motion recognition unit 10 or a function of the display device 100 corresponding thereto on the lower end of the screen, under the control of the control unit 20.

After the indicator has been performed as described above, when the motion recognition unit 10 recognizes a second motion of the user (step S3), the display unit 30 displays the recognized second motion or the function of the display device corresponding to the second motion on the indicator.

Thereafter, the control unit 20 may perform the function of the display device 100 corresponding to the second motion of the user 200.

The second motion may correspond to any one of a plurality of functions of the display device 100 which is controllable by the user's motions, for example, any one of hand motions as shown in FIG. 3.

Meanwhile, the location at which, or, the way in which, the above-described indicator 300 is displayed, may be modified.

For example, the indicator 300 may be displayed on a sub-screen within the screen of the display device 100 as shown in FIG. 8(*b*).

FIGS. 9 to 12 show embodiments for functions performed according to the hand motions of a user in the display device 100 and for indicator information displayed on the display unit 30.

Figure 9:
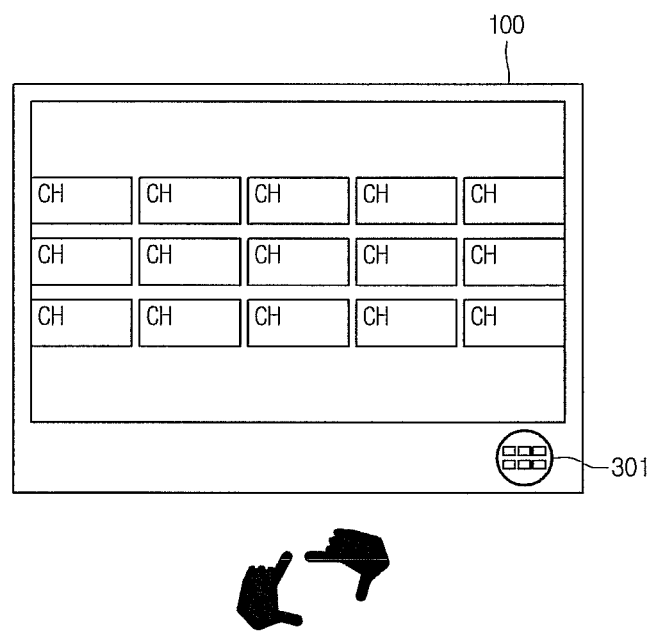

Referring to FIG. 9, when a user takes a hand motion of placing the tips of your index fingers and thumbs of both hands together as shown in FIG. 3(*a*), a channel browser displaying information about the plurality of channels as described above, or the like on the screen of the display device 100, or the like are displayed and the indicator 300 may display an icon 301 visually representing channel information display which is a function corresponding to the hand motion of the user.

As described above, the information about a function of the display device 100 corresponding to the hand motion of the user or a function currently performed on the screen is displayed using the indicator 300 and fed back to the user, thereby leading the user to take correct hand motions for the control of the display device 100 and preventing the malfunction of the display device 100 due to wrong hand motions or misrecognition.

Figure 10:
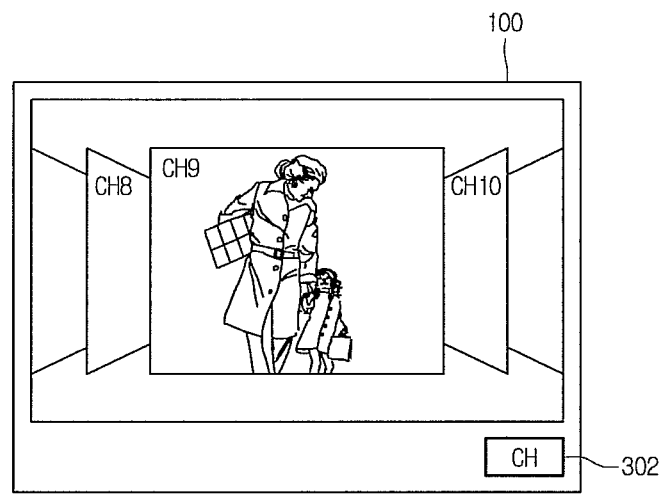

Referring to FIG. 10, when the user takes a hand motion of unfolding his/her palm toward the screen of the display device 100 and then moving it left or right as shown in FIG. 3(*b*), the video of a switched channel on the screen of the display device 100, and the indicator 300 may display an icon 302 visually representing channel switching which is a function corresponding to the hand motion of the user.

Figure 11:
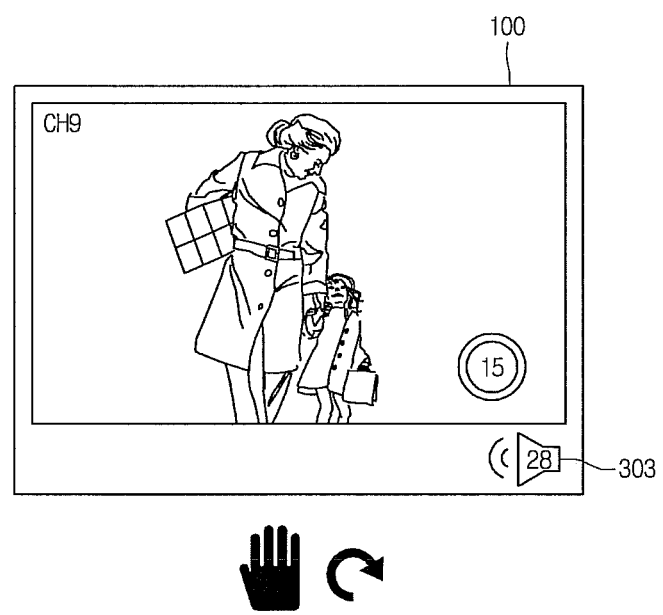

Referring to FIG. 11, when the user takes a hand motion of unfolding his/her palm toward the screen of the display device 100 and then rotating it as shown in FIG. 3(*c*), the modified volume of audio output is displayed on the screen of the display device 100, and the indicator 300 may display an icon 303 visually representing the volume adjustment of audio output which is a function corresponding to the hand motion of the user.

Figure 12:
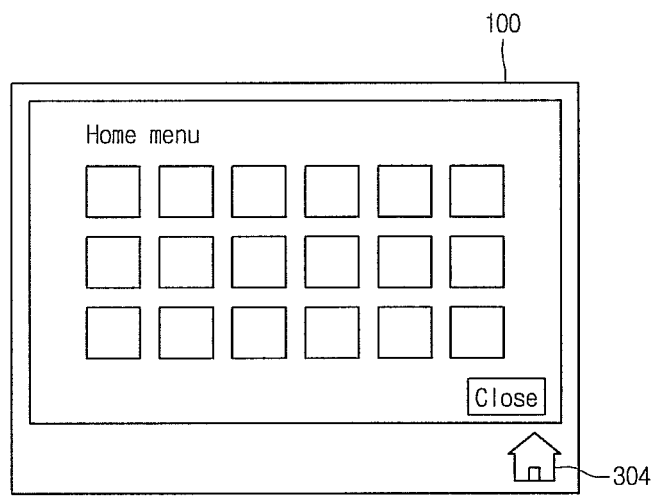
Figure 12:

Referring to FIG. 12, when the user takes a hand motion of clenching his/her first as shown in FIG. 3(*d*), menus for modification of various settings or functions of the display device 100 are activated on the screen of the display device 100, and the indicator 300 may display an icon 304 visually representing menu activation which is a function corresponding to the hand motion of the user.

Figure 13:
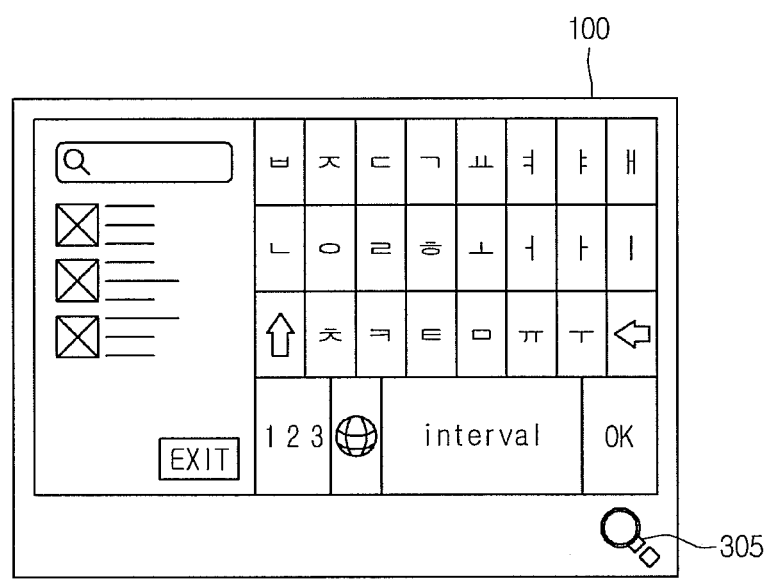

Meanwhile, when the user 200 selects a search menu on the menu screen as described above, the display device 100 may display a screen for search, for example, a keyboard image for input of search words, or the like, as shown in FIG. 13, and the indicator 300 may display an icon 305 visually representing the search performance.

Furthermore, the above-described indicator 300 may display information about the motions of the user respectively corresponding to the plurality of controllable functions of the display device 100, thereby easily leading the user to take hand motions to control the display device 100.

Figure 14:
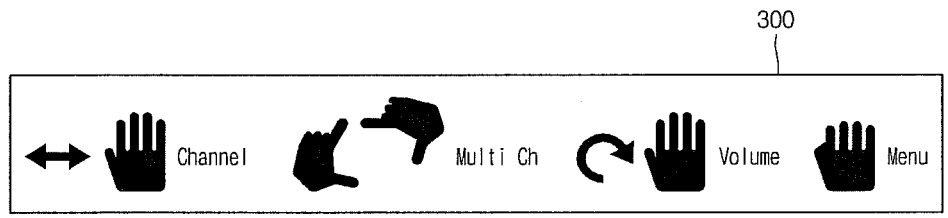

Referring to FIG. 14, the indicator 300 may display the predetermined hand motions of the user using visual images. Using a method of, when the user takes a specific hand motion, highlighting an image corresponding thereto, or the like, the image is discriminated from other images, so that the situation resulting from current performance by the display device 100 may be fed back to the user.

Figure 15:
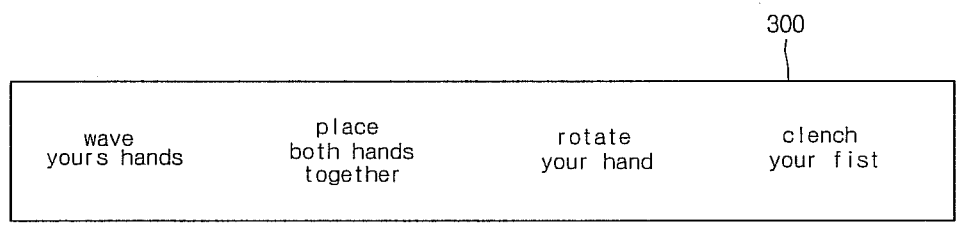

Meanwhile, referring to FIG. 15, the indicator 300 may display the predetermined hand motions of the user using texts.

Figure 16:
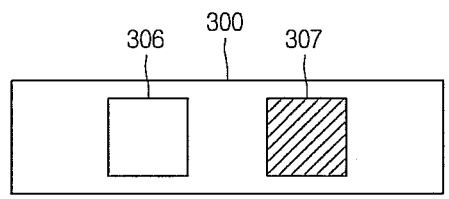

Furthermore, the indicator 300 may display feedback information representing the recognition results for the user motions, for example, whether there is the function of the display device 100 corresponding to the user motion recognized by the motion recognition unit 10 as shown in FIG. 16.

More specifically, when the there is the function of the display device 100 corresponding to the user motion, that is, when the user motion to control the display device 100 is correct, the indicator 300 may display an icon 306 having a specific color, for example, red.

On the contrary, when the there is no function of the display device 100 corresponding to the user motion, that is, when the user motion to control the display device 100 is incorrect, the indicator 300 may display the icon 307 having a color different from the specific color, for example, blue.

According to a second embodiment of the present invention, a control right for controlling the display device 100 through motions is assigned to a recognized specific user, and the display device 100 can not be controlled by a user not having the control right, thereby preventing the display device 100 from malfunctioning due to the general motions of a user and, therefore, efficiently controlling the display device 100.

Figure 17:
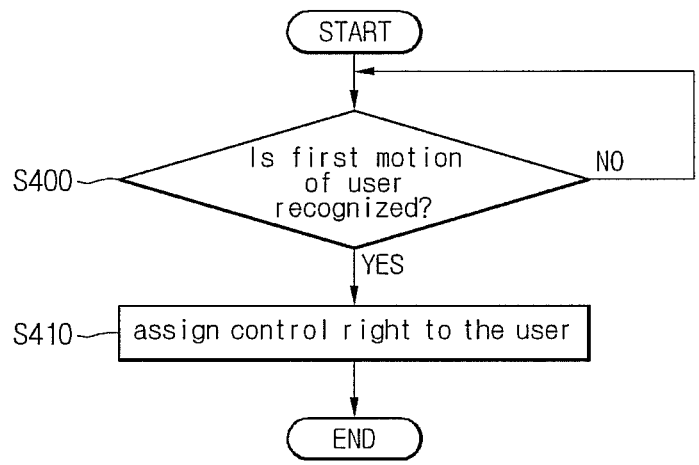
FIG. 17 is a flowchart showing a second embodiment of a method of controlling the display device according to the present invention.

FIG. 17 is a flow chart showing a second embodiment of the method for controlling a display device according to the present invention, which will be described in connection with the configuration of the display device 100 shown in FIGS. 1 and 5.

Referring to FIG. 17, when the motion recognition unit 10 recognizes a first motion of a first user (step S400), the control unit 20 assigns a control right to the first user (step S410).

The control right is a right to perform the functions of the display device 100 through motions. The display device 100 may be not controlled by other users except the first user given with the control right.

Meanwhile, the first motion is a predetermined motion for assignment of the control right as described above. For example, when the first user 200 located in front of the display device 100 takes the first motion of raising one hand as shown in FIG. 18, the first user may be assigned the control right.

Therefore, the control unit 20 assigns the control right to the first user 200 in response to the recognized first motion of the first user 200, that is, the motion of raising one hand, and causes the display device 100 to be not controlled through the motions of other users except the first user 200.

Figure 18:
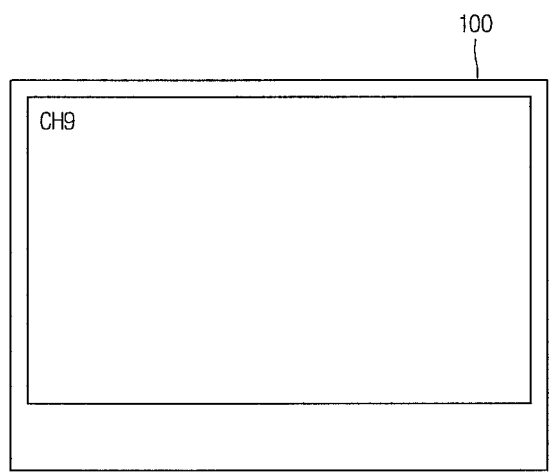
FIGS. 18 to 21 are diagram showing embodiments of a method for assigning a control right for the display device to a specific user.
Figure 19:
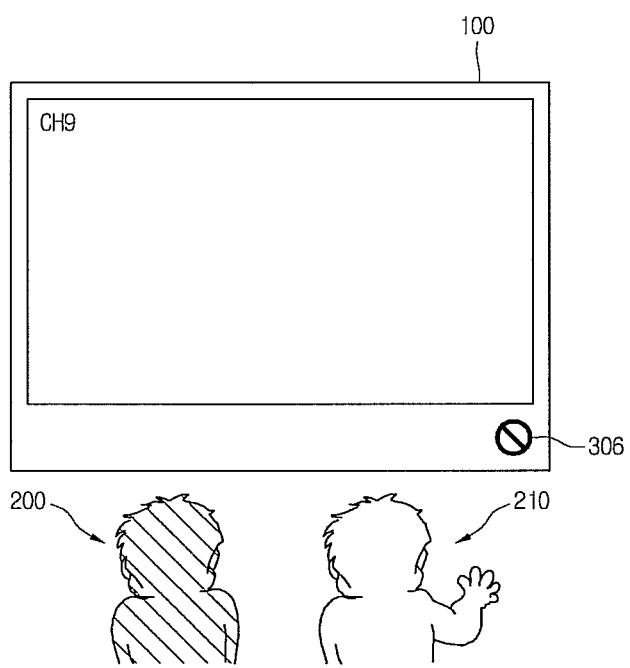

Referring to FIG. 19, in the case where the first user 200 has acquired the control right through the first motion of raising one hand as shown in FIG. 18, when a second user 210 not having the control right takes a motion to control the display device 100, the icon 306 representing that the second user 210 can not control the display device 100 because not having the control right may be displayed on the indicator 300.

As described above, when the control right is assigned to a specific user, for example, the first user 200, the state in which the control right is assigned to the first user 200 may be locked until a predetermined certain condition is satisfied.

Accordingly, until the control right is retrieved from the first user 200 and is in a free state as the predetermined condition is satisfied, the second user 210 may not acquire the control right.

Figure 20:
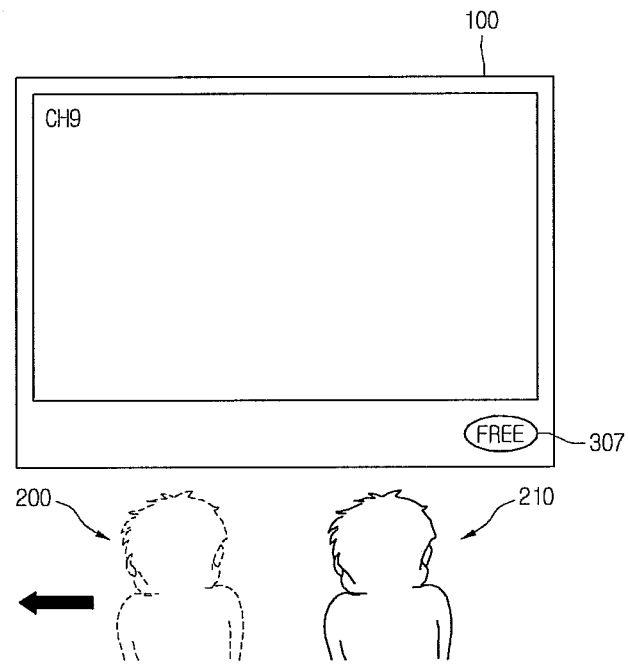

Referring to FIG. 20, when the first user 200 having the control right gets out of the front of the display device 100, for example, a specific area ahead of the display device 100 recognizable by the motion recognition unit 10 for predetermined time, the control right is retrieved from the first user 200 thereby being in a free state.

Meanwhile, the indicator 300 displayed on the screen may display the icon 307 representing that the control right is currently in a free state without being assigned to any user.

In this case, the second user 210 may be assigned the control right which is currently in a free state by taking a motion to acquire the control right, for example, the first motion of raising one hand as described above.

Furthermore, when the control right is in the 'free' state, and any one user, for example, the second user 210 is only located at the specific area ahead of the display device 100 as shown in FIG. 20, the control right may be automatically assigned to the second user 210.

The condition that allows the control right assigned to the first user 200 to be retrieved from the first user 200 to be in the 'free' state may be set in various ways.

Figure 21:
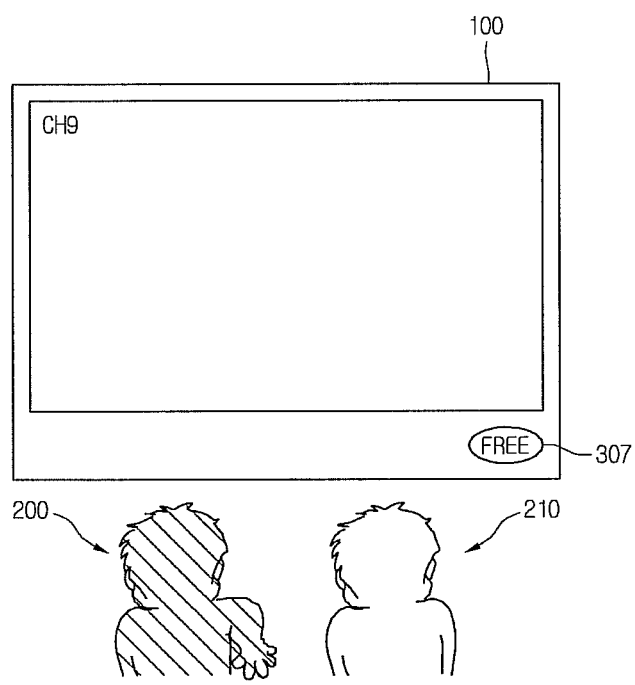

Referring to FIG. 21, when the first user 200 having the control right keeps taking a specific motion set to enable the control right to be in the 'free' state, for example a motion of lowering the first user' hand used for control for a predetermined time, the control right is retrieved from the first user 200, thereby being in the 'free' state.

Furthermore, the display device 100 or the like may include an initiation button for the control right. In this case, when the first user 200 presses the initiation button, the control right may be in the 'free' state as described above.

According to a third embodiment of the present invention, the control right assigned to a specific user may be switched or assigned to another user by a predetermined condition or motion, so that a plurality of users can easily control the display device without having a separate device, such as a remote controller, or the like.

Figure 22:
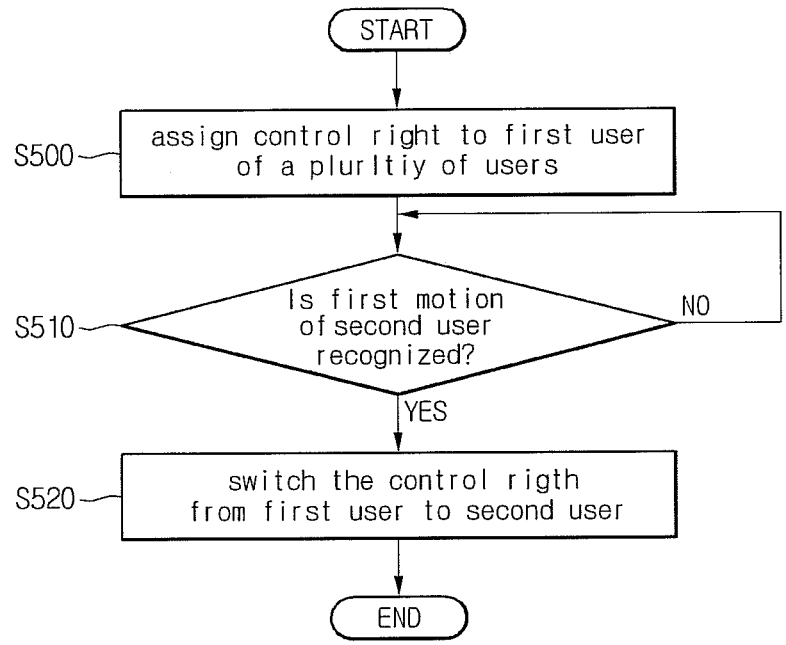
FIG. 22 is a flowchart showing a third embodiment of a method of controlling the display device according to the present invention.

FIG. 22 is a flow chart showing a third embodiment of a method for controlling a display device according to the present invention, which will be described in connection with the configuration of the display device 100 shown in FIGS. 1 and 5.

Referring to FIG. 22, the control unit 20 assigns the control right to a first user of a plurality of users (step 500). The method for assigning the control right in step 500 is identical to that as described with reference to FIGS. 17 to 21, the description of which is omitted below.

Thereafter, the motion recognition unit 10 recognizes the first motion of a second user (step 510), and the control unit 20 switches the control right from the first user to the second user in response to the recognized first motion of the second user (step 520).

For example, the first motion may be a predetermined motion in order to take over the control right for the display device 100 as described above.

Figure 23:
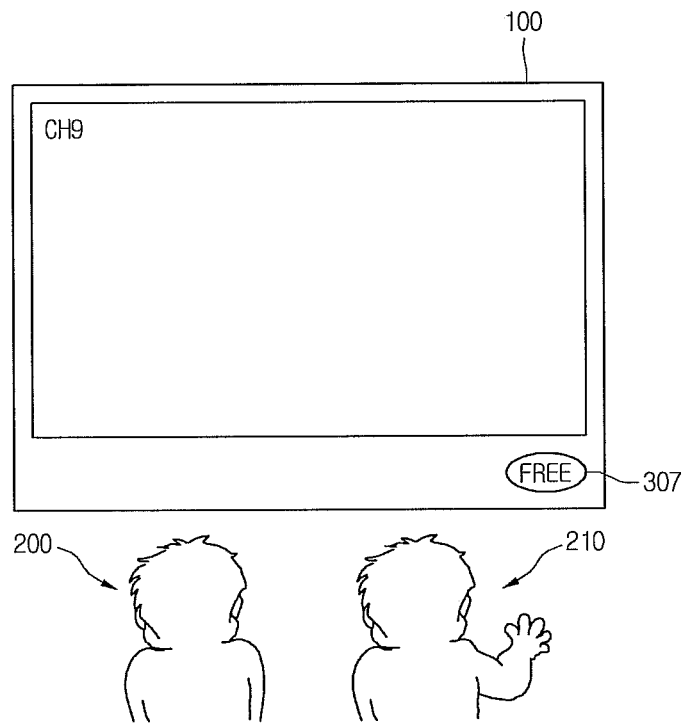
FIGS. 23 to 27 are diagrams showing embodiments of a method for switching the control right.

Referring to FIG. 23, when the control right is retrieved from the first user 200 and is in a free state, the second user 210 takes the first motion to take over the control right, for example, a motion of raising one hand, thereby causing the control right to be switched to the second user 210.

Figure 24:
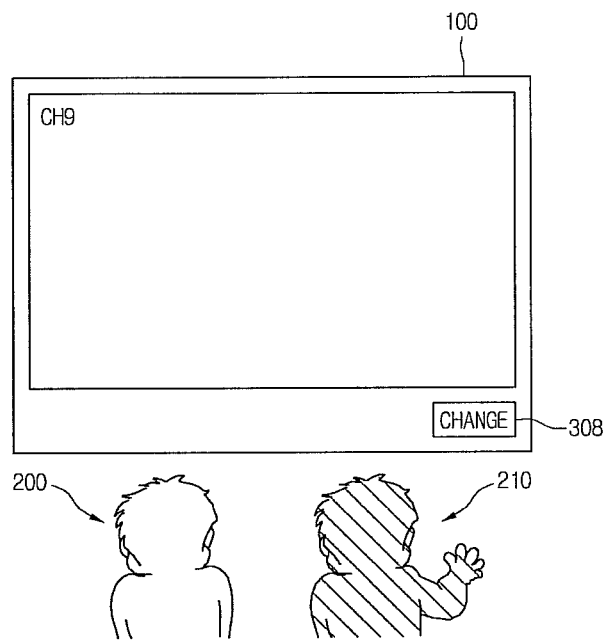

Referring to FIG. 24, when the control right is switched to the second user 210 as described above, an icon 308 representing that the control right has been switched may be displayed on a specific area of the screen, for example, using the indicator 300.

Figure 25:
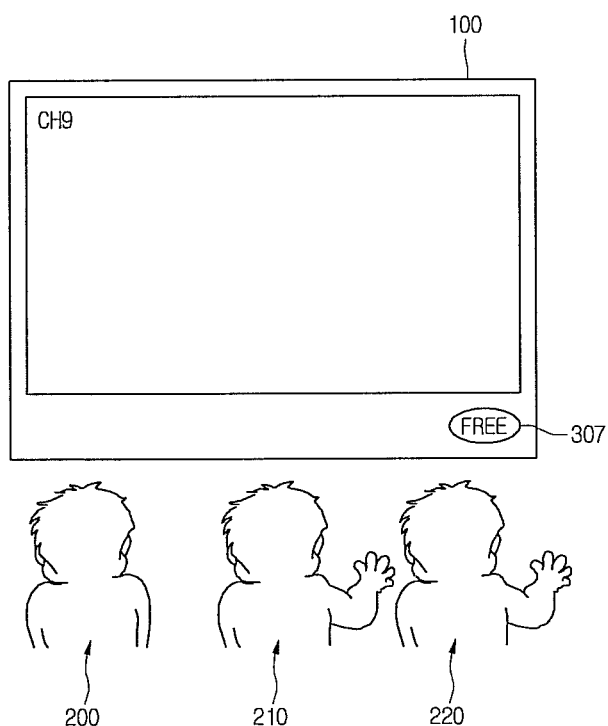

Referring to FIG. 25, when two users 210 and 220 of the plurality of users take the first motion to be given with or take over the control right, for example the motion of raising one hand, any one of two or more users 210 and 220 may be given with the control right.

Figure 26:
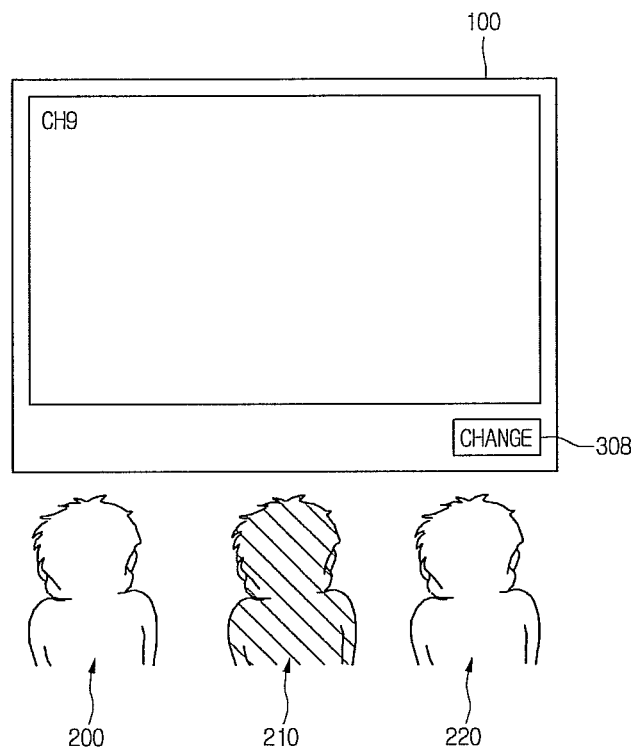

For example, the control right may be assigned to a user satisfying a specific condition of the two or more users 210 and 220. As shown in FIG. 26, a user, that at, the second user 210 most adjacent to a central area ahead of the display device 100 among the users 210 and 220 which want to take over the control right may be given with the control right.

Meanwhile, the motions of the user set to correspond to specific functions for control the display device 100 may be changed.

Figure 27:
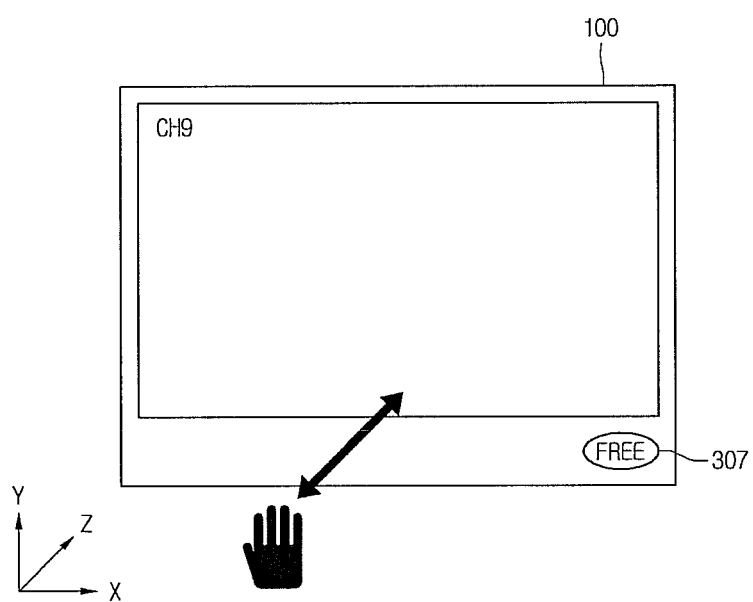

For example, the user takes a motion of unfolding and moving his/her palm close to or away from the display device 100 as shown in FIG. 27, thereby being given with or taking over the control right as described above.

That is, the motions of the user shown in FIG. 3 are defined according to the movement of the user's hands on an x-y plane among predetermined x, y, z axes. The motions of the user's hands to be given with or take over the control right as shown in FIG. 27 may be defined to be moved along z axis.

By defining the motions of the user's hands as described above, it is possible to decrease phenomenon in which the motions of the user's hands set to respectively correspond to the plurality of functions of the display device 100 are confused with each other, thereby causing the display device 100 to malfunction.

According an embodiment of the present invention, the display device 100 may display information about a user having the control right on the screen upon the assignment and switching of the control right as described with reference to FIGS. 17 to 27, thereby causing the user to easily know who currently has the control right.

Figure 28:
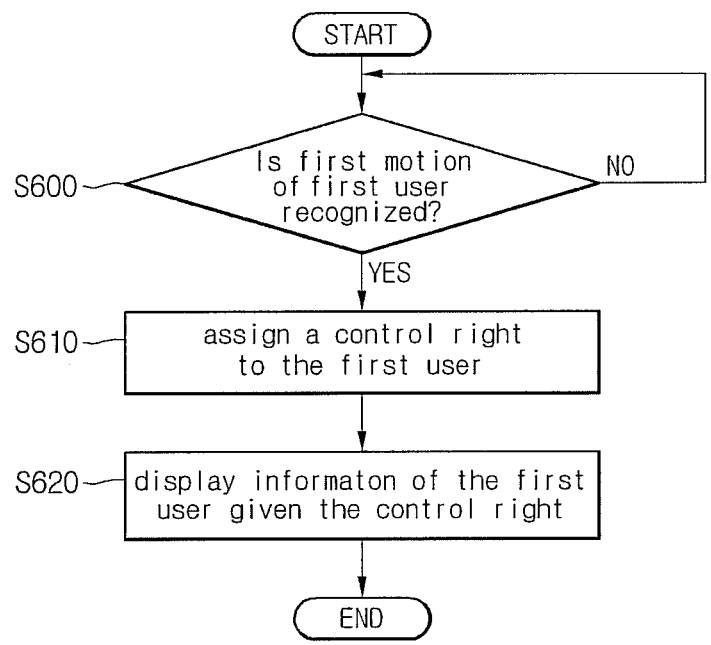
FIG. 28 is a flowchart showing a forth embodiment of a method of controlling the display device according to the present invention.

FIG. 28 is a flow chart showing a fourth embodiment of the method for controlling a display device according to the present invention, which will be described in connection with the configuration of the display device 100 shown in FIGS. 1 and 5.

Referring to FIG. 18, when the motion recognition unit 10 recognizes a first motion of a first user (step S600), the control unit 20 assigns the control right to the first user (step 610).

The control right is a right to perform the functions of the display device 100 through motions. The display device 100 may be not controlled by other users except the first user given with the control right.

Figure 29:
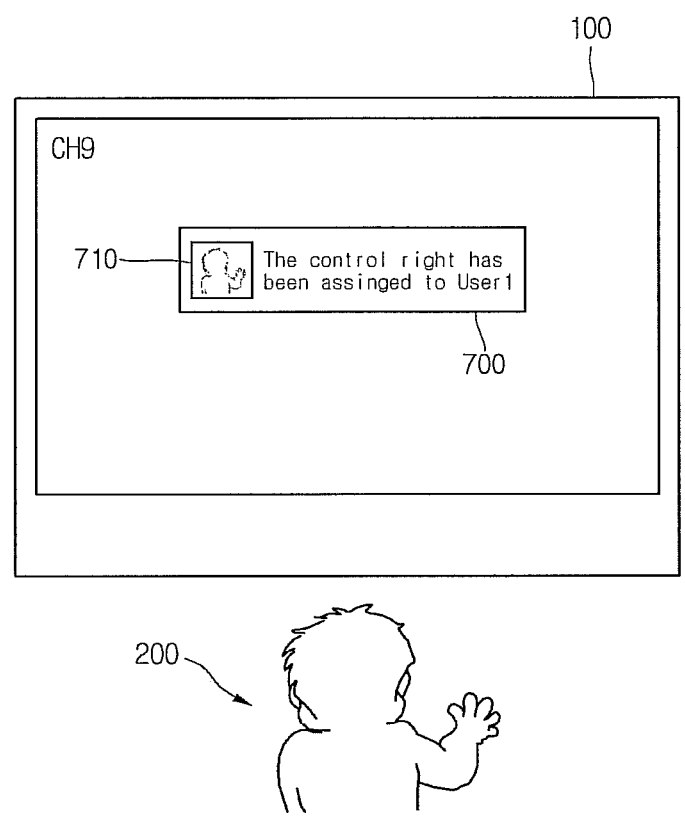
FIGS. 29 to 32 are diagram showing embodiments of a method for displaying information about a user having the control right.

Meanwhile, the first motion is a predetermined motion for assignment of the control right as described above. For example, when the first user 200 located in front of the display device 100 takes the first motion of raising one hand as shown in FIG. 29, the first user may be assigned the control right.

Therefore, the control unit 20 assigns the control right to the first user 200 in response to the recognized first motion of the first user 200, that is, the motion of raising one hand, and causes the display device 100 to be not controlled through the motions of other users except the first user 200.

Thereafter, the display unit 30 displays information about the first user given with the control right (step S620).

The information displayed in step S620 may include the image of the first user given with the control right, a message representing the current state of the control right, or the like.

Referring to FIG. 29, when the control right is assigned to the first user, a popup window 700 including information about the first user given with the control right on the screen of the display device 100.

For example, the popup window 700 may include the image 710 of the first user given with the control right, and a message representing that the control right has been assigned to the first user.

Meanwhile, the displayed image 710 of the first user may be an image captured from a video acquired by a camera module included in the motion recognition unit 10 in order to recognize the motion of the user, thereby displaying the current appearance of the first user.

As described above, the display device 100 displays information about the user given with the control right using the popup window 700, so that the user clearly know that the control right is assigned to himself/herself, thereby decreasing errors of motions to control the display device 100.

Figure 30:
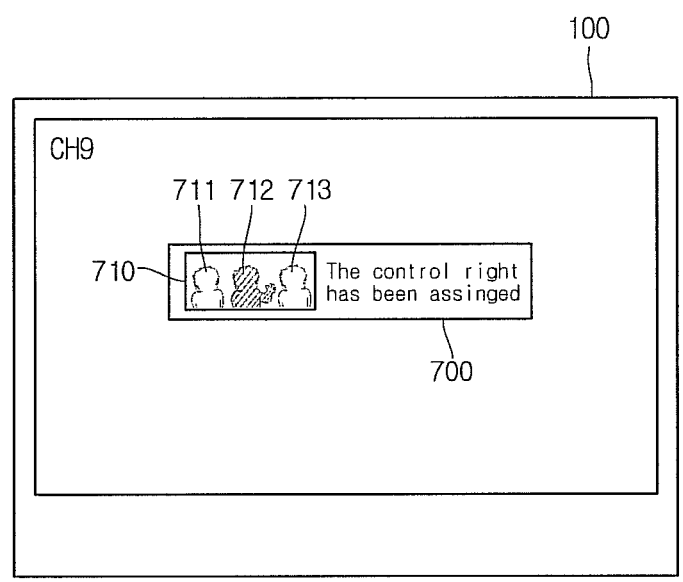
Figure 30:
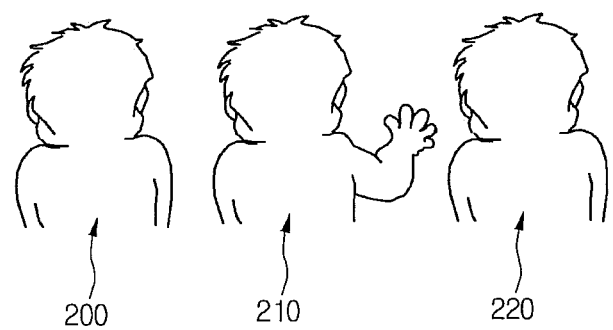

Referring to FIG. 30, the popup window 700 for displaying information about the user given with the control right may display the images 710 of the plurality of users located in front of the display device 100.

For example, when the second user 210 among the first to third users 200, 210 and 220 located in front of the display device 100 acquires the control right by raising the second user's hand, the images 710 including the first to third users 200, 210 and 220 may be displayed on the popup window 700, and the image 712 of the second user 210 acquiring the control right among the first to third users 200, 210 and 220 may be displayed to be discriminated from the images 711 and 713 of the first and third users 200 and 220.

The users may easily and intuitively know that the control right is assigned to the second user 210 currently located in the middle position, using the images 710 of the users and the message representing that the control right has been assigned, which are displayed on the popup window 700 as described above.

Meanwhile, even when the user having the control right is switched by the method as described with reference to FIGS. 22 to 27, the information about the switched user having the control right may be displayed using the popup window 700 as described above.

Figure 31:
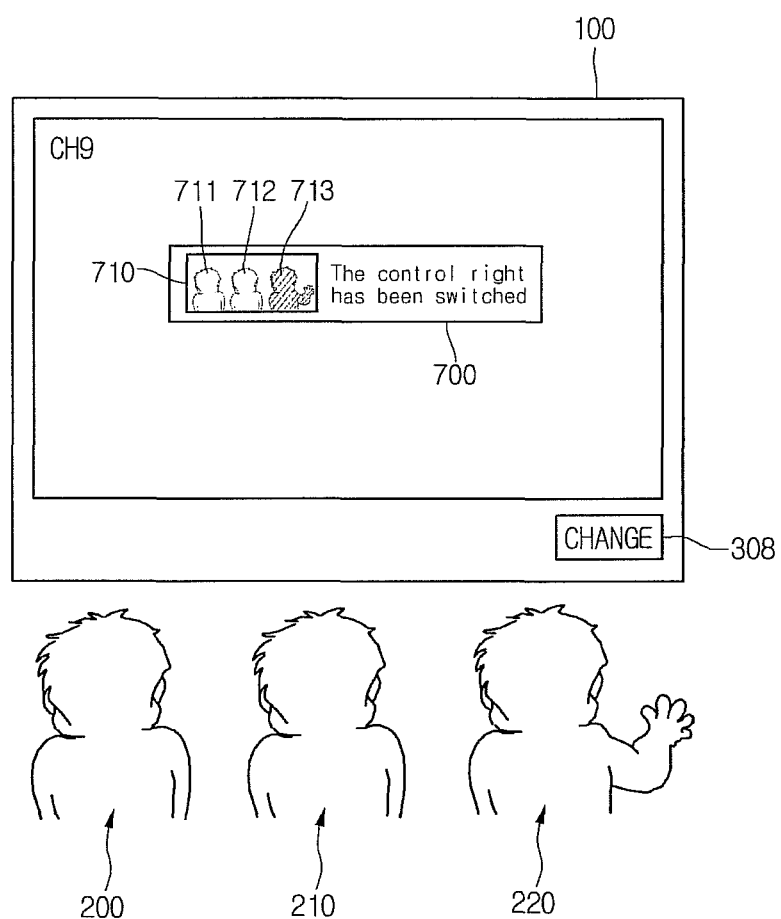

Referring to FIG. 31, when the control right is switched from the second user 210 to the third user 220, the popup window 700 including information about the third user 220 that is the switched user having the control right may be displayed on the screen.

For example, the image 713 of the third user 220, to which the control right is switched, among the images 710 of the users included in the popup window 700 is displayed to be discriminated from the images 711 and 712 of the first and second users 200 and 210, and the message representing that the control right has been switched may be displayed along with the popup window 700.

Using the popup window 700 as described above, the users may easily and intuitively know that the control right has been switched to the third user 220 currently located at the most right position.

Further, according to another embodiment of the present invention, even when a user no having the control right takes a motion to control the display device, the popup window 700 including information about a user currently having the control right may be displayed on the screen as described with reference to FIG. 19.

Figure 32:
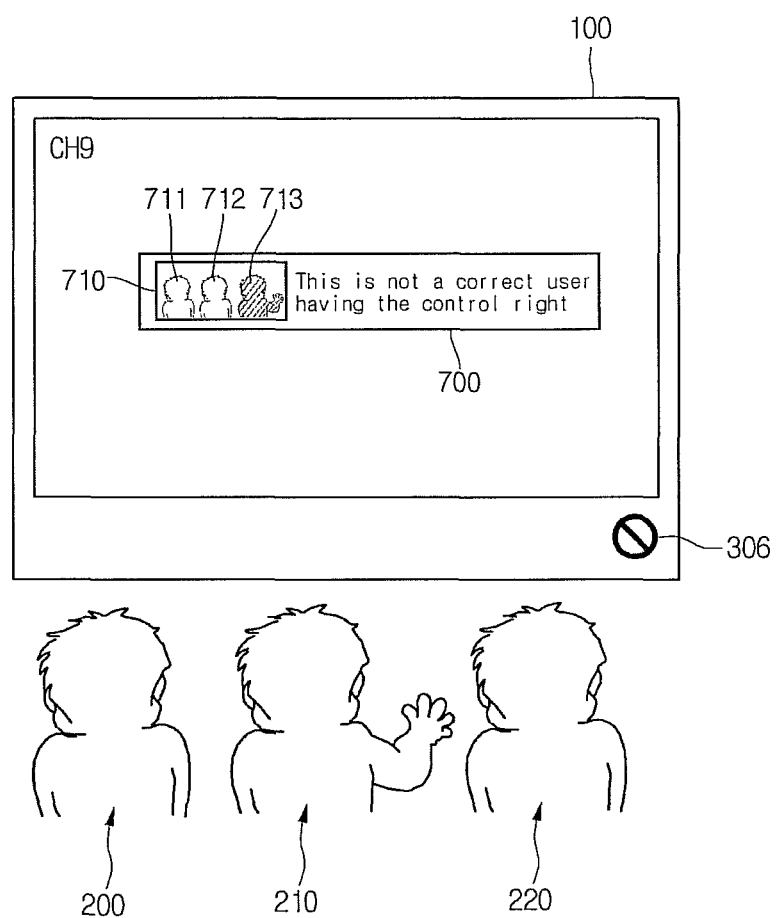

Referring to FIG. 32, in the state in which the third user 220 currently has the control right, when the second user 210 having no control right takes a motion of raising one hand, or the like in order to perform a specific function of the display device 100, the popup window 700 representing that the second user 210 does not have the control right may be displayed on the screen.

For example, the image 713 of the third user 220 currently having the control right among the images 710 of the users included in the popup window 700 is displayed to be discriminated from the images 711 and 712 of the first and second users 200 and 210, and the message representing that the user taking the motion to control the display device 100 does not have the control right may be displayed along with the popup window 700.

Accordingly, the second user 210 may easily and intuitively know that the second user 210 has to take over the control right from the third user 220 in order to perform a desired function of the display device 100.

Meanwhile, the method of controlling the display device according to the embodiments of the present invention is not limited to be performed by the display device as described above, and may be performed by various devices, such as portable phone which can display videos, a smart phone, a notebook computer, a digital broadcasting terminal, a PDA (Personal Digital Assistants), a PMP (Portable Multimedia Player), a navigation terminal and the like.

According to the embodiments of the present invention, the motion of the user of display device may be recognized and a function corresponding thereto is performed without using a separate device, such as an existing remote controller, or the like, thereby improving the convenience of the user.

Furthermore, the control right to control the display device through motions is assigned to a recognized specific user, and the display device can not be controlled by a user not having the control right, thereby preventing the display device from malfunctioning due to the general motions of the user and efficiently controlling the display device.

Furthermore, the control right assigned to a specific user may be switched or assigned to another user by a predetermined condition or motion, so that a plurality of users can easily control the display device without having a separate device, such as a remote controller, or the like.

Furthermore, users can easily know a user having the control right by displaying information, such as the image of a user having the control right or the like on the screen, thereby efficiently controlling the display device.

The above-described methods for controlling the operations of a display device according to the present invention can also be embodied as programs to be executable in a computer and be stored in a computer readable recording media. Examples of the computer readable recording media include read-only memory (ROM), random-access memory (RAM), CD-ROMs, magnetic tapes, floppy disks, optical data storage devices, and so on. Furthermore, it can be implemented as carrier waves (such as data transmission through the Internet).

Further, the computer-readable recording media are distributed on computer systems connected through the network, and thus the computer-readable recording media may be stored and executed as the computer-readable code by a distribution scheme. Further, functional programs, codes, and code segments for implementing the control method can be easily inferred by programmers in the related art.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. A method for controlling a device, the method comprising:
   capturing an image including a first image corresponding to a first user and a second image corresponding to a second user;
   detecting a first motion of the first user;
   assigning, in response to the detected first motion, a control right to the first user, wherein the control right represents that functions of the device can be controlled based on motions of the first user; and
   displaying the first image corresponding to the first user who has the control right and the second image corresponding to the second user who does not have the control right, wherein the first image is displayed to be discriminated from the second image, wherein the control right is retrieved from the first user who has the control right and a state of the control right is changed to a free state when a specific motion of the first user who has the control right is detected during a predetermined time; and
   displaying an indicator representing that the state of the control right is in the free state, wherein the free state represents that any user does not have the control right,
   wherein when the control right is in the free state, a first motion of the second user who does not have the control right and a first motion of a third user who does not have the control right are detected, and the control right is assigned to the second user who is located most adjacent to a central area ahead of the device among the second user and the third user.

2. The method of claim 1, further comprising denying the second user the control right to control the device based on motions of the second user.

3. The method of claim 1, wherein the functions of the device include one of a channel information display, a channel switching, an audio output volume adjustment, a menu selection or a search.

4. The method of claim 1, further comprising:
   detecting a second motion of the first user assigned the control right; and
   performing a function of the device that corresponds to the detected second motion.

5. The method of claim 1, further comprising outputting information that there is no control right when the second user performs motion in front of the device.

6. The method of claim 1, further comprising changing the assignment of the control right from the first user to the second user when the first motion of the second user is detected.

7. The method of claim 1, further comprising outputting, on a screen, information regarding the first user assigned the control right.

8. The method of claim 7, wherein outputting information regarding the first user is performed upon assignment or changing of the control right.

9. A device, comprising:
   a display;
   a camera configured to capture an image including a first image corresponding to a first user and a second image corresponding to a second user; and
   a control unit configured to:
      detect a first motion of the first user,
      assign, in response to the detected first motion, a control right to the first user, wherein the control right represents that functions of the device can be controlled based on motions of the first user, and
      display the first image corresponding to the first user who has the control right and the second image corresponding to the second user who does not have the control right, wherein the first image is displayed to be discriminated from the second image, and
   wherein the control right is retrieved from the first user who has the control right and a state of the control right is changed to a free state when a specific motion of the first user is detected during a predetermined time,
   wherein the control unit displays an indicator representing that the state of the control right is in the free state, wherein the free state represents that any user does not have the control right,
   wherein when the control right is in the free state, a first motion of the second user who does not have the control right and a first motion of a third user who does not have the control right are detected, and the control right is assigned to the second user who is located most adjacent to a central area ahead of the device among the second user and the third user.

10. The device of claim 9, wherein the control unit changes the control right that had been assigned from the first user to the second user when the first motion of the second user is detected.

11. The device of claim 9, wherein the control unit outputs a popup window including the plurality of images and a message representing the control right has been assigned to the first user.

* * * * *